US012314827B2

(12) United States Patent
Farsad et al.

(10) Patent No.: US 12,314,827 B2
(45) Date of Patent: May 27, 2025

(54) SYSTEMS AND METHODS FOR TRANSMITTING AND RECEIVING DATA USING MACHINE LEARNING CLASSIFICATION

(71) Applicant: The Board of Trustees of the Leland Stanford Junior University, Stanford, CA (US)

(72) Inventors: Nariman Farsad, Stanford, CA (US); Andrea Goldsmith, Stanford, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 1943 days.

(21) Appl. No.: 15/896,982

(22) Filed: Feb. 14, 2018

(65) Prior Publication Data

US 2018/0232574 A1 Aug. 16, 2018

Related U.S. Application Data

(60) Provisional application No. 62/458,936, filed on Feb. 14, 2017.

(51) Int. Cl.
*G06N 20/10* (2019.01)
*G06F 18/214* (2023.01)
(Continued)

(52) U.S. Cl.
CPC .......... *G06N 20/10* (2019.01); *G06F 18/214* (2023.01); *G06F 18/24* (2023.01); *G06F 18/241* (2023.01);
(Continued)

(58) Field of Classification Search
CPC ............. G06K 9/00536; G06K 9/6256; G06K 9/6267; G06K 9/6268; G06N 3/0445; G06N 3/0454; G06N 3/08; G06N 20/10; G06N 5/003; G06N 20/00; G06N 20/20; G06N 3/04; G06N 3/044; G06N 3/045;
(Continued)

(56) References Cited

U.S. PATENT DOCUMENTS 5,546,503 A 8/1996 Abe et al.
6,690,746 B1 2/2004 Sills et al.
(Continued)

FOREIGN PATENT DOCUMENTS

WO 2018152246 A1 8/2018

OTHER PUBLICATIONS

Bhattacharyya, D. K., & Kalita, J. K. (2013). Network anomaly detection: A machine learning perspective. CRC Press. (Year: 2013).*

(Continued)

*Primary Examiner* — Shane D Woolwine
(74) *Attorney, Agent, or Firm* — KPPB LLP

(57) ABSTRACT

Systems and methods detect messages in transmitted and received data in communication systems in accordance with embodiments of the invention. In one embodiment, a communication system controller includes a processor, a memory, and a receiver, wherein the processor obtains a transmission signal using the receiver, extracts features in the transmission signal, and detects a message in the transmission signal based on the extracted features using a machine learning classifier.

16 Claims, 13 Drawing Sheets

(51) Int. Cl.
*G06F 18/24* (2023.01)
*G06F 18/241* (2023.01)
*G06N 3/044* (2023.01)
*G06N 3/045* (2023.01)
*G06N 3/08* (2023.01)
*G06N 5/01* (2023.01)

(52) U.S. Cl.
CPC ............. *G06N 3/044* (2023.01); *G06N 3/045* (2023.01); *G06N 3/08* (2013.01); *G06F 2218/12* (2023.01); *G06N 5/01* (2023.01)

(58) Field of Classification Search
CPC .......... G06N 5/01; G06N 3/098; G06V 10/40; G06F 18/214; G06F 18/24; G06F 18/241; G06F 2218/12; H04B 17/20; H04W 24/02; G06Q 10/107; H04L 63/1425
See application file for complete search history.

(56) References Cited

U.S. PATENT DOCUMENTS

| 8,494,464 | B1 | 7/2013 | Kadambe et al. | |
|---|---|---|---|---|
| 9,473,257 | B1* | 10/2016 | Judell | H04W 24/02 |
| 2005/0074834 | A1* | 4/2005 | Chaplen | G01N 15/1475 |
| | | | | 702/19 |
| 2008/0220530 | A1* | 9/2008 | Bahn | G01R 33/465 |
| | | | | 436/63 |
| 2008/0293353 | A1 | 11/2008 | Mody et al. | |
| 2009/0047920 | A1 | 2/2009 | Livsics et al. | |
| 2015/0193695 | A1* | 7/2015 | Cruz Mota | H04L 63/1425 |
| | | | | 706/12 |
| 2015/0254555 | A1* | 9/2015 | Williams, Jr. | G06N 3/084 |
| | | | | 706/14 |
| 2016/0285568 | A1* | 9/2016 | Judell | H04W 24/02 |
| 2017/0032247 | A1 | 2/2017 | Tadesse et al. | |
| 2017/0318035 | A1* | 11/2017 | Baughman | H04L 61/4511 |
| 2018/0336424 | A1* | 11/2018 | Jang | G06T 7/75 |
| 2018/0365975 | A1* | 12/2018 | Xu | G08B 13/08 |

OTHER PUBLICATIONS

O'Shea, T. J., Hitefield, S., & Corgan, J. (2016). End-to-end radio traffic sequence recognition with deep recurrent neural networks. arXiv preprint arXiv:1610.00564. (Year: 2016).*

Nguyen, D., Nguyen, C., Duong-Ba, T., Nguyen, H., Nguyen, A., & Tran, T. (2016). Joint Network Coding and Machine Learning for Error-prone Wireless Broadcast. arXiv preprint arXiv:1612.08914. (Year: 2016).*

Thilina, K. M., Choi, K. W., Saquib, N., & Hossain, E. (2013). Machine learning techniques for cooperative spectrum sensing in cognitive radio networks. IEEE Journal on selected areas in communications, 31(11), 2209-2221. (Year: 2013).*

'Elements of artificial neural networks'; Mehrotra, MIT press, 1997 (Year: 1997).*

International Preliminary Report on Patentability for International Application PCT/US2018/018238, Report issued Aug. 20, 2019, Mailed Aug. 29, 2019, 6 pgs.

International Search Report and Written Opinion for International Application No. PCT/US2018/018238, Search completed Apr. 20, 2018, Mailed May 8, 2018, 11 pgs.

* cited by examiner

SYSTEMS AND METHODS FOR TRANSMITTING AND RECEIVING DATA USING MACHINE LEARNING CLASSIFICATION

CROSS-REFERENCE TO RELATED APPLICATIONS

The instant application claims priority to U.S. Provisional Patent Application No. 62/458,936, titled "Systems and Methods for Transmitting Data Using Machine Learning Classification" and filed Feb. 14, 2017, the disclosure of which is hereby incorporated by reference in its entirety.

FEDERAL FUNDING STATEMENT

This invention was made with Government support under contract 0939370 awarded by the National Science Foundation. The Government has certain rights in the invention.

FIELD OF THE INVENTION

The present invention generally relates to communication systems and more specifically to systems and methods for machine learning classification in communication systems.

BACKGROUND

Communication systems are designed to transfer information, which are typically transmitted in the form of encoded messages. Messages can take a wide variety of formats, and depending on the specific communication system, are transported using different signals which can include (but are not limited to) electronic signals, optical signals, and/or electromagnetic signals.

Generally, a message is sent from a transmitter through a channel to a receiver. Where the properties of the channel are known, or can be measured, information regarding the properties of the channel can be utilized in the modulation of transmitted signals and/or the configuration of receivers to increase the reliability and/or throughput of a communication system. Examples of different communication systems include (but are not limited to) telegraph, radio, telephone, cellular, acoustic communication, and/or cable systems.

SUMMARY OF THE INVENTION

Systems and methods for transmitting and receiving data using machine learning classification in accordance with embodiments of the invention are disclosed. In one embodiment of the invention, a communication system controller includes a processor, a memory, and a receiver, wherein the processor obtains a transmission signal using the receiver, extracts features in the transmission signal, classifies the transmission signal based on the extracted features, and detects a message in the transmission signal using a machine learning classifier based on the classified transmission signal.

In another embodiment of the invention, the processor further trains the machine learning classifier using the classified transmission signal.

In an additional embodiment of the invention, the processor fails to detect a message in the classified transmission signal and the processor retrains the machine learning classifier using training data.

In yet another additional embodiment of the invention, the processor redetects a message in the transmission signal using the machine learning classifier after retraining the machine learning classifier.

In still another additional embodiment of the invention, the transmission signal is added to the training data.

In yet still another additional embodiment of the invention, the receiver receives the transmission signal via a communication channel.

In yet another embodiment of the invention, the communication channel is selected from the group consisting of twisted-pair wires, coaxial cables, fiber optic cables, and tubes for chemicals.

In still another embodiment of the invention, the communication channel is selected from the group consisting of microwave, satellite, radio, and infrared.

In yet still another embodiment of the invention, features are extracted from the transmission signal are based on properties of the signal selected from the group consisting of the phase of the signal, the magnitude of the signal, the rate at which the signal is changing, and the average received signal power.

In yet another additional embodiment of the invention, the machine learning classifier includes a recurrent neural network.

Still another embodiment of the invention includes a method including obtaining a transmission signal using a communication system controller including a processor, a memory, and a receiver, extracting features in the transmission signal using the communication system controller, classifying the transmission signal based on the extracted features using the communication system controller, and detecting a message in the transmission signal using a machine learning classifier based on the classified transmission signal using the communication system controller.

In yet another additional embodiment of the invention, the method further includes training the machine learning classifier based on the classified transmission signal using the communication system controller.

In still another additional embodiment of the invention, the method further includes failing to detect a message in the classified transmission signal using the communication system controller and retraining the machine learning classifier based on training data using the communication system controller.

In yet still another additional embodiment of the invention, the method further includes redetecting a message in the transmission signal using the machine learning classifier after retraining the machine learning classifier using the communication system controller.

In yet another embodiment of the invention, the transmission signal is added to the training data.

In still another embodiment of the invention, the communication system controller receives the transmission signal via a communication channel.

In yet still another embodiment of the invention, the communication channel is selected from the group consisting of twisted-pair wires, coaxial cables, fiber optic cables, and tubes for chemicals.

In yet another additional embodiment of the invention, the communication channel is selected from the group consisting of microwave, satellite, radio, and infrared.

In still another additional embodiment of the invention, features are extracted from the transmission signal are based on properties of the signal selected from the group consisting of the phase of the signal, the magnitude of the signal, the rate at which the signal is changing, and the average received signal power.

In yet still another additional embodiment of the invention, the machine learning classifier includes a recurrent neural network.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the claims.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE DRAWINGS

Figure 1:
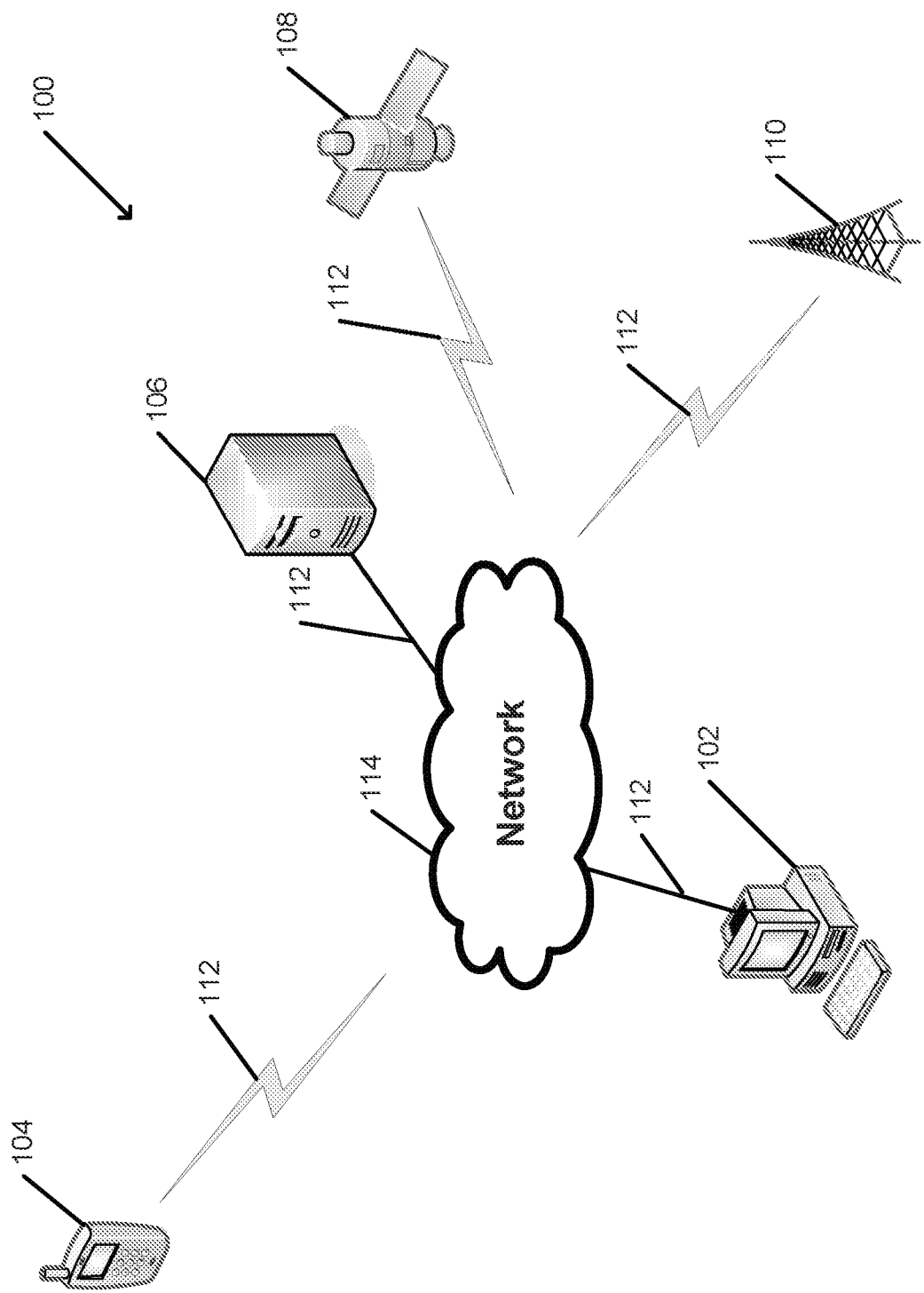
FIG. 1 is a diagram conceptually illustrating a communication system in accordance with an embodiment of the invention.

Turning now to the drawings, systems and methods for transmitting and receiving data using machine learning classification in accordance with embodiments of the invention are described. Communication systems generally involve sending a message from a transmitter over a channel and detecting that message at a receiver. In many embodiments of the present invention, the transmitter transmits a message by converting digital data into a transmitted signal. These transmitted signals can take on a variety of forms including (but not limited to) electronic signals, optical signals, electromagnetic signals, acoustic signals, and/or chemical signals.

In many embodiments, a communication channel (or channel) is a path along which and/or a medium through which a signal is transmitted from a transmitter to a receiver. In various embodiments of the invention, a channel can be a physical channel such as (but not limited to) a twisted-pair wires, coaxial cables, fiber optic cables and/or tubes for chemicals. Channels can also involve transmissions through free space such as (but not limited to) microwave, satellite, radio, and/or infrared.

In a variety of embodiments, a receiver detects a received signal passed through a channel. In several embodiments of the invention, a received signal is translated into at least one binary value of a one or a zero (depending upon the modulation scheme used a received signal can represent a single or multiple bits of transmitted data). In many embodiments of the invention, a sequence of ones and/or zeros can be detected. In particular, sequences can be detected using machine learning processes.

In a number of embodiments, machine learning processes utilized by communication systems to detect signals in the absence of knowledge of the characteristics of the channel over which the signal is transmitted can be trained with supervised learning. A known sequence of messages, which can be referred to as a training set, is transmitted by the transmitter. The resulting signal received in response to the transmission of each message can be used to train the machine learning process. Once the machine learning system is trained using the training set, the machine learning system can detect (or classify) unknown messages in received signals. When messages are correctly classified, information from the transmitter and receiver collected during the transmission of the correctly classified message can be added to the training set to continuously improve the performance of a classifier. Similarly, information related to incorrectly classified messages can be added to the training data set to improve the precision of the machine learning system.

In some embodiments of the invention, feature extraction can be used on received signals prior to supervised learning and/or unknown message classification. Feature extraction can reduce the amount of data processed by a machine learning system by combining variables, or features, in a meaningful way that still accurately describes the underlying data. It should be readily apparent to one having ordinary skill in the art that many feature extraction techniques are available such as (but not limited to) principal component analysis, independent component analysis, isomap analysis, convolutional neural networks, and/or partial least squares, and feature extraction itself is optional. In various embodiments of the invention, partial knowledge of the channel and/or its effect on the signal can be used for feature selection. For example (but not limited to), the phase and/or magnitude of the signal, the rate at which a concentration is changing, and/or the average received signal power can be extracted as features based on partially known system behavior.

Any of a variety of different classifiers that can be trained using machine learning processes can be utilized within a machine learning based communication system as appropriate for specific applications of the invention including (but not limited to) decision-trees, k-nearest neighbors (KNN), support vector machines (SVM), neural networks (NN), and/or a combination of several classifiers, where at least one classifier is trained via a machine learning process. In several embodiments of the invention, a recurrent neural network (RNN) can be used to detect messages in received signals. Variants of RNNs can include (but are not limited to) long-short term memory RNNs and gated recurrent unit RNNs.

In some embodiments of the invention, a communication system transmits a message through a chemical signal. As an illustrative example, various pH values can be used to represent a zero and a one, where an acid has a zero value and a base has a one value. It should be readily apparent to one having ordinary skill in the art that this example is merely illustrative and other chemical combinations of messages can be utilized including (but not limited) messages other than base-2 (such as but not limited to acid, base, nothing for base-3), additional chemicals, different types of acids, different concentrations of the same acid, proteins, and/or enzymes. In various embodiments of the invention, a machine learning process detects the message in a chemical signal. While chemical channels are utilized in order to illustrate the capabilities of communication systems that utilize machine learning classifiers in accordance with several embodiments of the invention, similar communication systems can be utilized with respect to communication via any of a variety of conventional channels.

Communication Systems

A communication system in accordance with an embodiment of the invention is illustrated in FIG. 1. Messages are passed within the communication system 100 from a source to a destination. In many embodiments of the invention, the source of the message is a transmitter. In various other embodiments of the invention, the destination is a receiver. Specific communication systems can have different requirements for transmitters and/or receivers. In several embodiments of the invention, transmitters and/or receivers can include (but are not limited to) computer 102, mobile device 104, server 106, satellite 108, and/or broadcast tower 110. It should be readily apparent to one having ordinary skill in the art that additional transmitters and/or receivers can be part of a communication system as specific applications involving specific communication channels require.

Elements in a communication system can communicate with each other via channel 112. This channel can be wired or wireless depending on requirements of the communication system. In some embodiments of the invention, channel 112 can directly connect a transmitter and a receiver. In many other embodiments of the invention, a transmitter and a receiver can additionally be connected through network 114.

Although a number of different communication systems are described herein with respect to FIG. 1, any of a variety of sources capable of sending messages to a destination can be utilized as appropriate to the requirements of specific applications in accordance with various embodiments of the invention. Communication system controllers in accordance with various embodiments of the invention are discussed below.

Communication System Architectures

Figure 2:
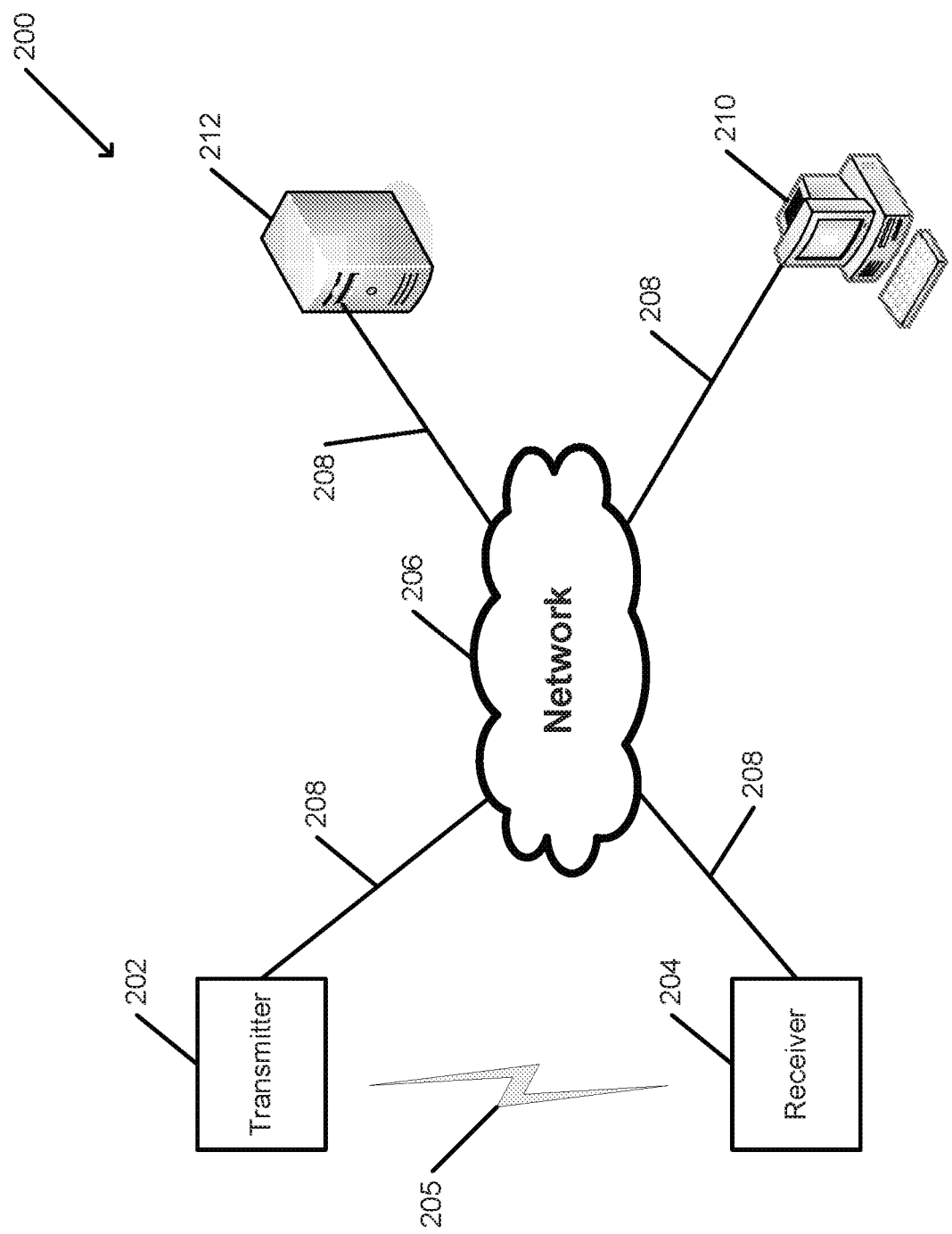
FIG. 2 is a diagram illustrating a communication system architecture in accordance with an embodiment of the invention.

A transmitter and a receiver in a communication system in accordance with an embodiment of the invention is shown in FIG. 2. One or more transmitters 202 and one or more receivers 204 can connect to communication network 206 through backhaul connections 208. In various embodiments, a network such as (but not limited to) a power distribution network can act in place of a conventional data network. A transmitter 202 can send one or more messages to a receiver 204 via a communication channel. In the illustrated embodiment, the message can be sent as a radio frequency signal over a wireless channel 205. In other embodiments, any of a variety of channels including a multipath wireless channel, a wired channel, and/or a chemical channel can be utilized. Accordingly, the transmitted signals can take on a variety of forms including (but not limited to) electronic signals, optical signals, electromagnetic signals, acoustic signals, and/or chemical signals.

Receiver 204 receives transmitted messages. In many embodiments of the invention, the receiver decodes the message from a transmitted signal. In various embodiments of the invention, the communication network may also be connected to one or more centralized computers 210 which can (but are not limited to) monitor message transmission, facilitate message transmission, or send instructions to transmitters and/or receivers. Additionally, in many embodiments, a database management system 212 can be connected to the network to track message, transmitter and/or receiver data which, for example, may be used to track message transmission accuracy over time. In various embodiments, transmitters and/or receivers can use one or more communication system controllers to facilitate the transmission and/or receipt of messages.

Although many systems are described herein with reference to FIG. 2, any of a variety of systems can be utilized to implement transmitting and receiving messages as appropriate to the requirements of specific applications in accordance with different embodiments of the invention.

Communication System Controllers

Figure 3:
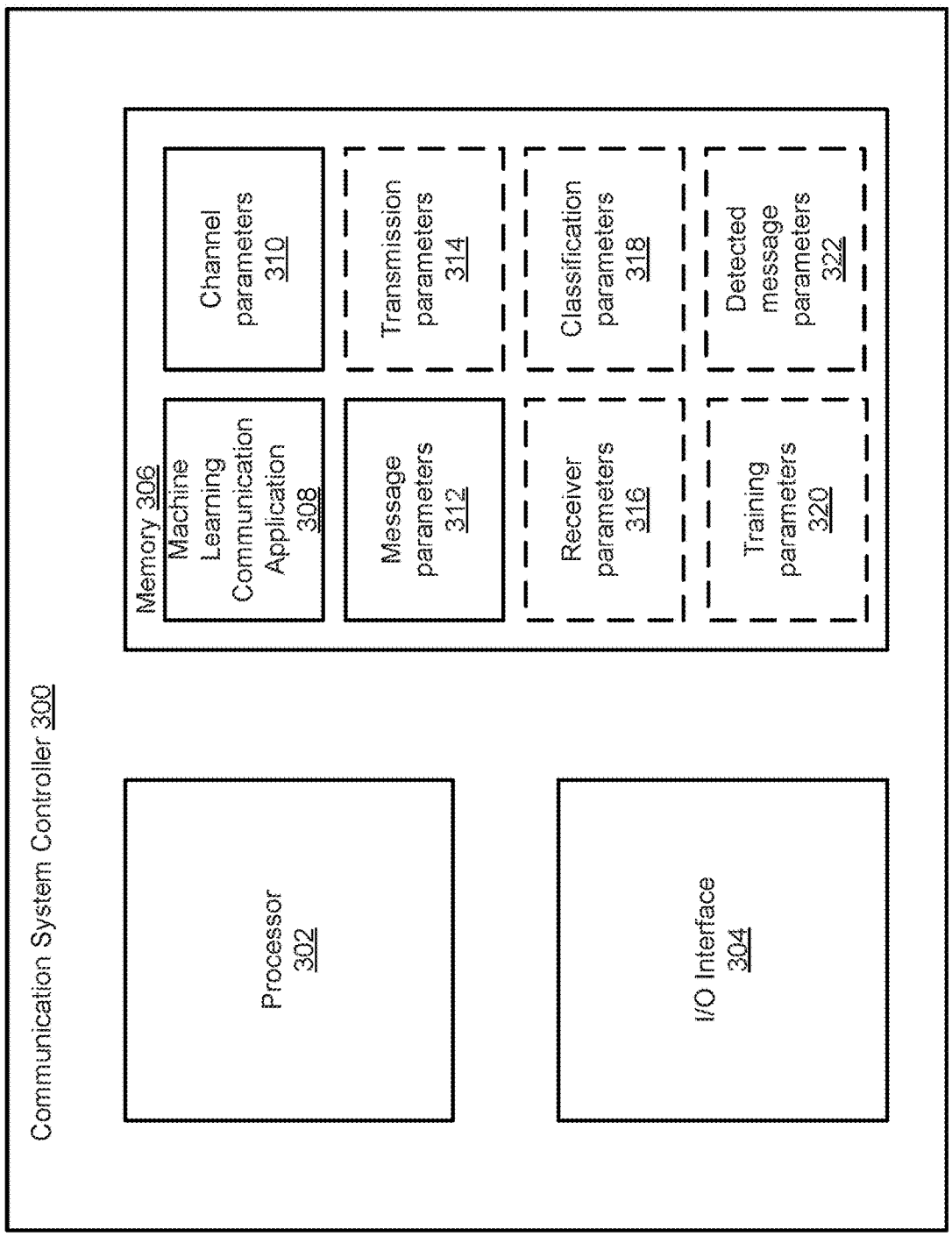
FIG. 3 is a block diagram of a communication system controller in accordance with an embodiment of the invention.

A communication system controller 300 in accordance with an embodiment of the invention is illustrated in FIG. 3. In several embodiments, communication system controller 300 can perform calculations to transmit and/or receive a message in a communication system. In many embodiments, communication system controllers can perform calculations on one or more centralized computers similar to those described with respect to FIG. 2, and the one or more centralized computers can send instructions to transmitters and/or receivers in the communication system. In many other embodiments, communication system controllers can perform calculations and send instructions from transmitters and/or receivers themselves.

In the illustrated embodiment, the communication system controller includes at least one processor 302, an I/O interface 304, and memory 306. The at least one processor 302, when configured by software stored in memory, can perform calculations on and make changes to data passing through the I/O interface as well as data stored in memory. In many embodiments, the memory 306 includes software including (but not limited to) a machine learning communication application 308 as well as any one or more of: channel parameters 310, message parameters 312, transmission parameters 314, receiver parameters 316, classification parameters 318, training parameters 320, and/or detected message parameters 322. In several embodiments, machine learning communication applications can utilize (but are not limited to) support vector machine classifiers and/or neural network classifiers to classify transmitted messages. Channel parameters can include parameters specific to methods of transmitting messages such as parameters relating to (but not limited to) chemical signals. In several embodiments, message parameters can include (but are not limited to) a message to be transmitted.

In many embodiments of the invention, communication system controllers can utilize a variety of optional parameters. Optional transmission parameters can include a transmission signal and/or a variety of other parameters for signal transmission. Similarly, optional receiver parameters can include a received signal and/or a variety of other parameters for a signal receiver. In various embodiments of the invention, machine learning processes can be utilized to classify received signals. Optional classification parameters can include (but are not limited to) parameters for specific machine learning processes to classify messages such as neural network parameters and/or support vector machine parameters as well as feature parameters for a feature extraction process. Many machine learning processes are initially trained with known data and/or continuously train themselves with each classification. In several embodiments, optional training parameters can include (but are not limited to) known messages used to train the machine learning process. Additionally, in several embodiments, optional detected message parameters can include (but are not limited to) messages detected by machine learning communication applications.

Although a number of different communication system controller implementations are described herein with reference to FIG. 3, any of a variety of computing systems can be utilized to control the transmission, receiving, and/or decoding of messages using machine learning processes within a communication system as appropriate to the requirements of specific applications in accordance with various embodiments of the invention. Communication system processes that can transmit, receive, and detect messages in accordance with many embodiments of the invention are discussed below.

Communication System Processes

Figure 4:
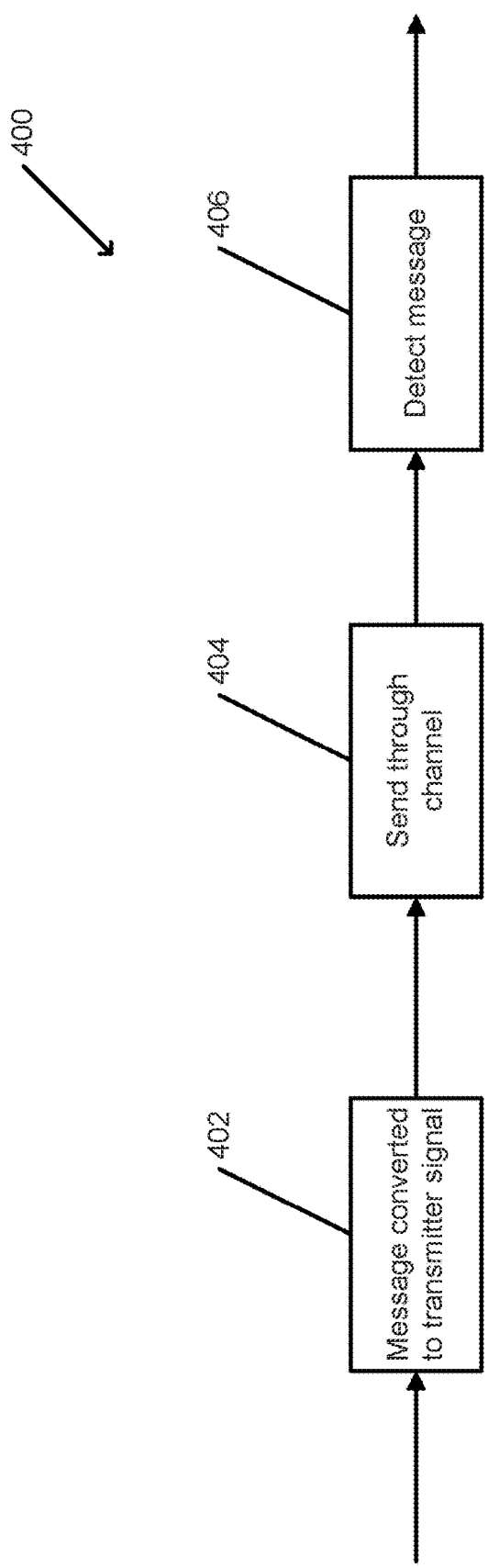
FIG. 4 is a flowchart illustrating a communication process used to transmit messages within a communication system in accordance with an embodiment of the invention.

An overview of a communication system process 400 to transmit, receive, and detect a message in accordance with an embodiment of the invention is illustrated in FIG. 4. In several embodiments of the invention, a message is converted (402) to a transmitted signal by a transmitter. It should be readily apparent to one having ordinary skill in the art that a variety of transmitters can be utilized as appropriate to requirements of specific applications and can include (but are not limited to) a computer, mobile device, server, satellite, and/or broadcast tower. The transmitted signal is transmitted (404) through a communication channel. In many embodiments, the channel is the communication medium through which a signal is transmitted within the communication system and the type of channel can vary from system to system, time to time, and/or within different geographies spanned by a communication system.

Transmitted signals are transmitted through the channel to a receiver. A receiver detects (406) messages in the received signal. Since a receiver may have no prior knowledge of the transmitted signal, a receiver can estimate the transmitted message using a detection process. In many embodiments of the invention, a machine learning process can be utilized to detect messages such as (but not limited to) processes similar to those discussed with respect to FIG. 6.

Although a variety of communication system processes to transmit, receive, and detect messages are described with respect to FIG. 4, any of a variety of processes may be utilized to reliably transfer information within a communication system using machine learning to determine channel characteristics as appropriate to the requirements of specific applications in accordance with various embodiments of the invention. Machine learning processes that can be utilized to train classifiers utilized in the detection of messages in accordance with various embodiments of the invention are discussed below.

Training Classifiers Used in Detection Processes Using Machine Learning

In some embodiments of the invention, machine learning can further be divided into supervised learning and classification. Supervised learning uses known data to train a classifier how to classify messages. Classification involves using the classifier to detect unknown messages. In some embodiments, the results of classification can be utilized to expand the training data set and the additional training data is used to train an updated classifier.

Figure 5:
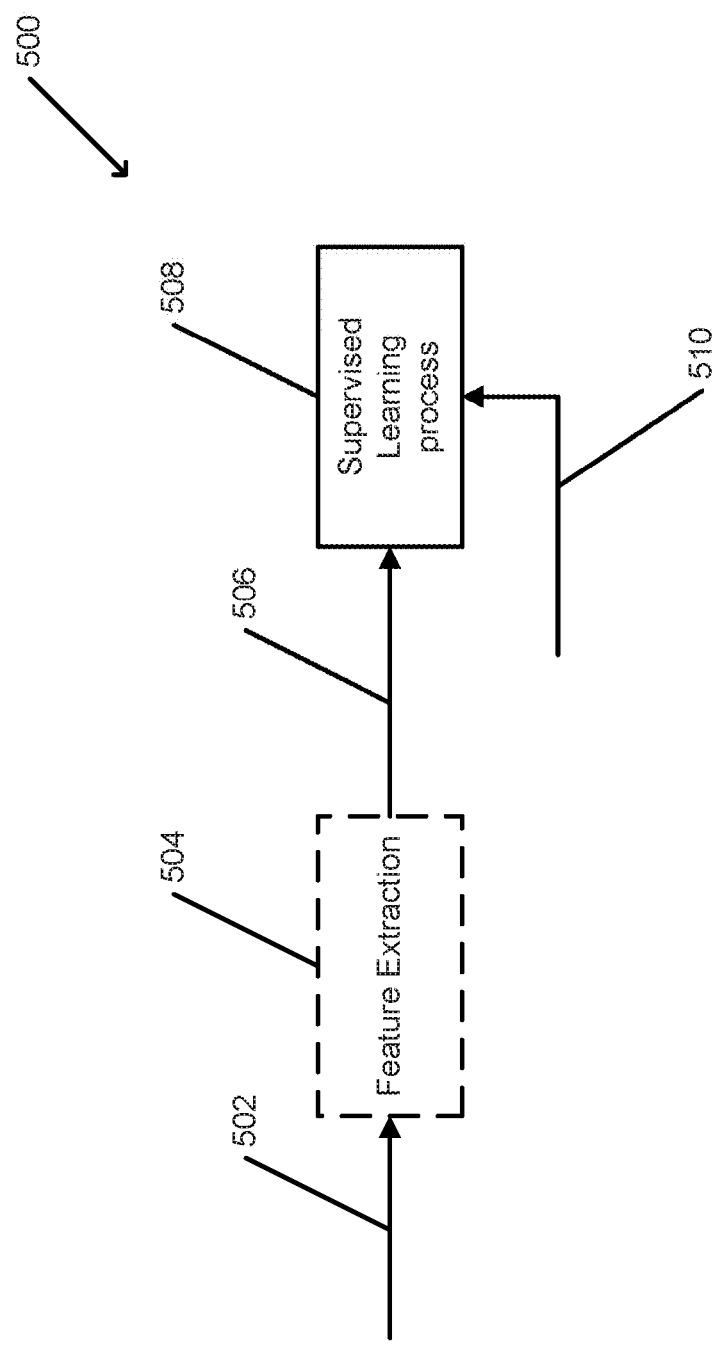
FIG. 5 is a flowchart conceptually illustrating a process for performing supervised learning as part of a machine learning process used within a communication system in accordance with an embodiment of the invention.

A supervised machine learning process 500 in accordance with an embodiment of the invention is illustrated in FIG. 5. In many embodiments of the invention, supervised learning uses a set of training data that is annotated with ground truth metadata describing the training data (i.e. the ground truth metadata is known to accurately describe the training data) to train one or more parameters of a classifier to accurately detect messages from received signals. In many embodiments, the classifier is optimized according to a certain objective (often reflected in an objective function that measures the performance of the classifier). A known message is transmitted through the communication system to the receiver. The detected message is compared with the known value of the message, and in many embodiments, (potentially very small and/or no) changes are made to the parameters of the classifier based on the differences between the detected message and the known value of the message.

In some embodiments of the invention, features are extracted 504 from the received signal 502. Feature extraction can reduce the amount of data processed by a classifier relative to the quantity of data captured by the receiver in receiving the received signal. In certain embodiments, the extracted features are a combination of features that efficiently and accurately describes the data. In many embodiments of the invention, feature extraction techniques can include (but are not limited to) principal component analysis, independent component analysis, isomap, convolutional neural networks and/or partial least squares analysis. In some embodiments of the invention, partial knowledge of the channel can be used in feature selection. For example (but not limited to), the phase and/or magnitude of the signal, the rate at which a concentration changes, and/or the average received signal power can be extracted as features based on partially known system behavior.

Supervised learning process 508 detects a message in extracted features and/or received signals 506. Supervised learning process 508 compares the detected message with a known message 510 and in various embodiments, uses the detected message and the known message to train the machine learning classifier. It should be readily apparent to one having ordinary skill in the art that a variety of machine learning classifiers can be utilized as appropriate to specific requirements of the present invention including (but not limited to) decision trees, k-nearest neighbors, support vector machines, neural networks, and/or a combination of a variety of classifiers.

Figure 6:
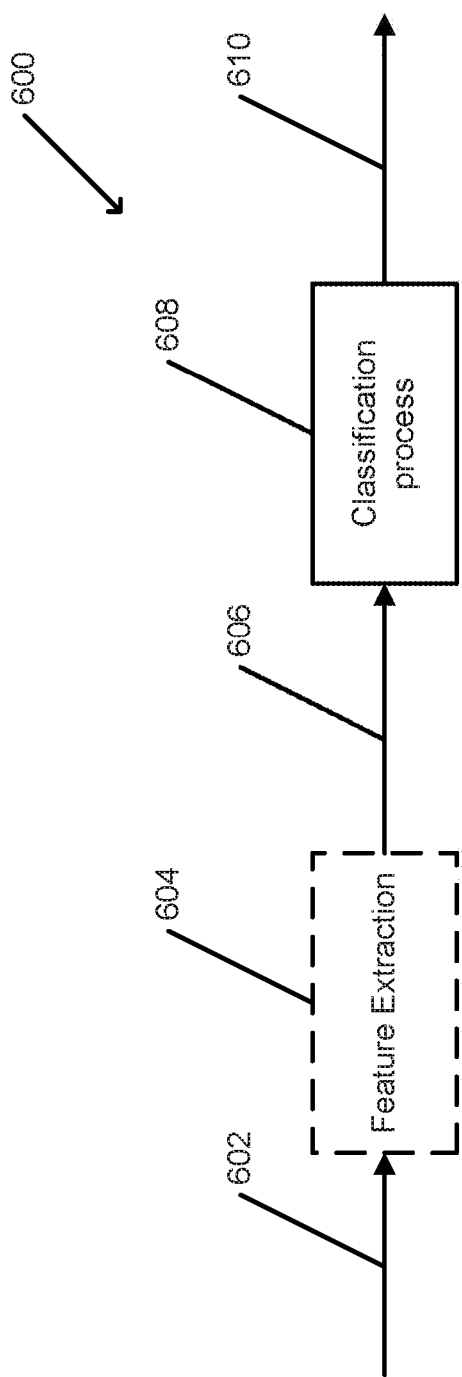
FIG. 6 is a flowchart conceptually illustrating a classification process performed as part of a machine learning process in a communication system in accordance with an embodiment of the invention.

A classification machine learning process 600 in accordance with an embodiment of the invention is illustrated in FIG. 6. In many embodiments of the invention, a trained machine learning process can be used to classify a received signal 602. Features can be extracted 604 from the received signal in a manner similar to feature extraction as described with respect to FIG. 5. Classification process 608 can detect messages in extracted features and/or received signals 606. A variety of classifiers trained using machine learning may be utilized in accordance with embodiments of the invention including (but not limited to) decision trees, k-nearest neighbors, support vector machines, neural networks, and/or a combination of machine learning classifiers.

In many embodiments of the invention, error correction and/or detection codes can be used on detected message 610 such that the receiver knows if the message was detected correctly and/or to correct errors in detected messages. Successfully detected messages 610 can be used to further train the machine learning process. In some embodiments of the invention, detected message errors can trigger retraining of the machine learning process (such as but not limited to a certain number of consecutive errors and/or a certain number of errors in a set amount of time).

Although a variety of machine learning processes are described with reference to FIGS. 5 and 6, any of a variety of processes may be utilized to train machine learning processes to classify received signals as appropriate to the requirements of specific applications in accordance with embodiments of the invention. Communication systems with machine learning processes to detect transmitted messages in accordance with many embodiments of the invention are discussed below.

Machine Learning Processes for Communication Systems

Figure 7:
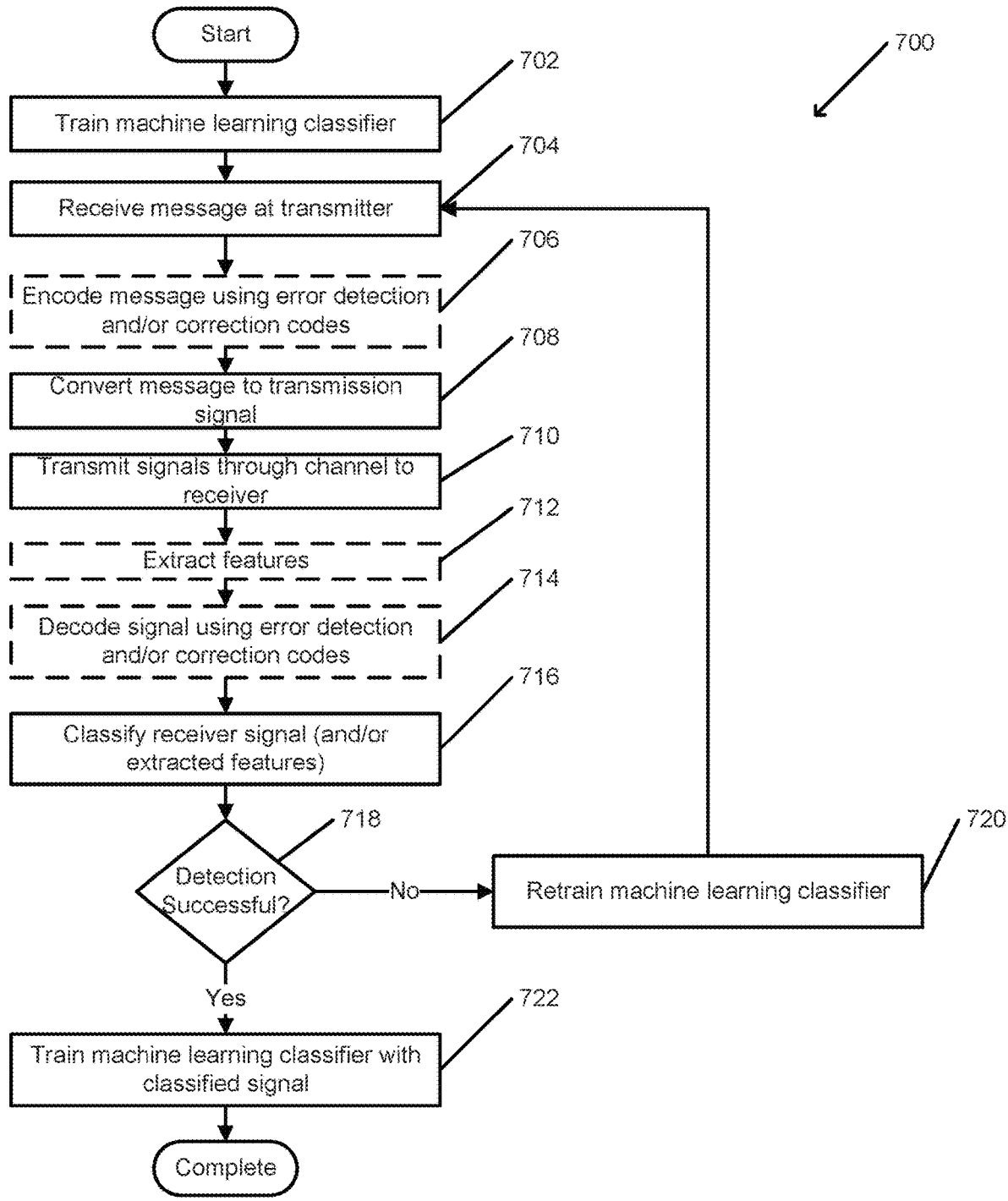
FIG. 7 is a flowchart illustrating a machine learning process used by a communication system to classify transmitted messages in accordance with an embodiment of the invention.

A process for detecting messages transmitted within a communication system using a classifier trained by a machine learning process in accordance with an embodiment of the invention is illustrated in FIG. 7. As discussed herein, communication systems that perform processes similar to those illustrated in FIG. 7 can include a transmitter and/or a receiver to transmit and/or receive a message. In many embodiments of the invention, a communication system controller similar to that described in FIG. 3 can be used to control the transmission and/or detection of messages.

The process 700 includes training (702) a classifier using a machine learning process based upon a training data set annotated with ground-truth metadata. It should be readily apparent to one having ordinary skill in the art that a variety of machine learning processes can be utilized including (but not limited to) training of a decision trees, k-nearest neighbors, support vector machine and/or a neural network. In some embodiments of the invention, a supervised learning process similar to that discussed with respect to FIG. 5 can be utilized to train the classifier.

Messages are received (704) by a transmitter. A variety of transmitters can be utilized including (but not limited to) a computer, mobile device, server, satellite, and/or broadcast tower. The message can optionally be encoded (706) using error detection and/or correction codes. In some embodiments of the invention, encoding with error detection and/or correction codes can add extra redundancy to a transmitted message such that the receiver can detect and/or correct potential errors in the transmitted message. The message is converted (708) to a transmission signal by the transmitter. The transmission signal can take a variety of forms depending on specific requirements of embodiments of the present invention and can include (but are not limited to) electronic signals, optical signals, electromagnetic signals, acoustic signals, and/or chemical signals.

In several embodiments of the invention, the signals generated by the transmitter are transmitted (710) through the channel to the receiver. Features can optionally be extracted (712) at the receiver. Feature extraction can combine the amount of data in the received signal by making meaningful combinations of the data (i.e. combining features in the data) in a way that still gives an accurate description of the data. In many embodiments of the invention, feature extraction techniques can include (but are not limited to) principal component analysis, independent component analysis, isomap analysis, convolutional neural networks, and/or partial least squares analysis. In some embodiments of the invention, partial knowledge of the channel can be used in feature selection. For example (but not limited to), the phase and/or magnitude of the signal, the rate at which a concentration changes, and/or the average received signal power can be extracted as features based on partially known system behavior.

The signal can be optionally be decoded (714) using error detection and/or correction codes. A variety of error correction and/or detecting codes including (but not limited to) repetition codes, parity bits, checksums, cyclic redundancy checks, cryptographic hash functions, error-correcting codes, automatic repeat requests, turbo codes, low density parity check codes, repeat accumulate codes, and/or hybrid schemes can be utilized to verify a message is detected correctly and/or correct errors in detected messages based upon known correlations between sequences of bits and/or messages in a transmitted sequence of errors introduced through the encoding of the transmitted message data. In some embodiments of the invention, classification processes using classifiers trained via machine learning similar to the classification processes described with respect to FIG. 6 can be utilized. In other embodiments, any of a variety of classification processes can be utilized as appropriate to the requirements of a given application.

The classifier trained using the machine learning process classifies (716) the received signal and/or extracted features. If the detection is successful (718) the classifier can be trained using the classified signal (722) and the process completes.

If a message is not successfully detected (718) correctly, the machine learning classifier can be retrained (720) and the message can be received again (704).

Although a variety of processes for transmitting and/or receiving messages in a communication system are illustrated with respect to FIG. 7, any of a variety of processes using classifiers trained via machine learning to decode messages in a communication system can be utilized as appropriate to the requirements of specific applications in accordance with a number of embodiments of the invention. Classifiers trained via machine learning in accordance with various embodiments of the invention are described below.

Classifier Training

A variety of classifiers trained via machine learning can be utilized in accordance with a variety of embodiments of the invention to classify messages transmitted within a communication system. Classifiers can include (but are not limited to) decision trees, k-nearest neighbors, support vectors machines, and/or neural networks. A number of embodiments utilize decision trees as classifiers, including (but not limited to) bagging decision trees, random forest classifiers, boosted trees, and/or rotation forests. In many embodiments, k-nearest neighbors can be used a classifier, including (but not limited to) density based k-nearest neighbor classifiers, variable k-nearest neighbor classifiers, weighted k-nearest neighbor classifiers, class based k-nearest neighbor classifiers, and/or discernibility k-nearest neighbor classifiers. In a variety of embodiments, a support vector machine can be used as a classifier, including (but not limited to) support vector machines with Gaussian kernels, linear support vector machines, support vector clustering, multiclass support vector machines, transductive support vector machines, structured support vector machines, and/or support vector machine regression. As can readily be appreciated the specific classifier utilized depends upon the characteristics of the signal being channeled, which often depends upon the characteristics of the channel and may often depend upon whether the channel has memory of pervious message transmissions.

In several embodiments, neural networks can be utilized as a classifier, including (but not limited to) recurrent neural networks, feed-forward neural networks, self-organizing maps, autoencoders, probabilistic neural networks, time delay neural networks, convolutional neural networks, and/or regulatory feedback neural networks. Recurrent neural networks can optionally further include (but are not limited to) long short-term memory, gated recurrent units, Hopfield networks, Boltzmann machines, simple recurrent networks, echo state networks, bi-directional recurrent neural networks, hierarchical recurrent neural networks, and/or stochastic neural networks.

Chemical Communication Systems

Figure 8:
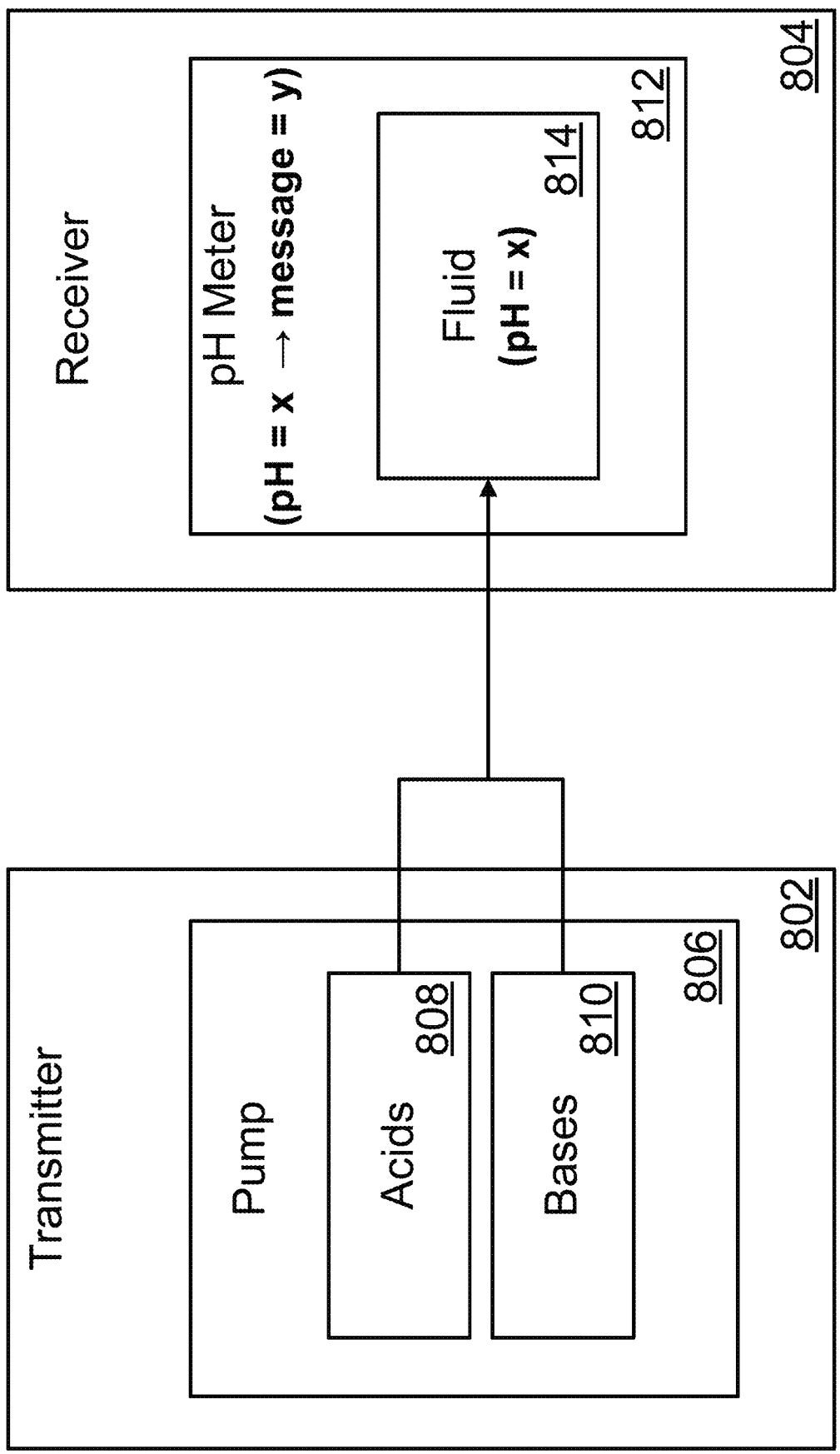
FIG. 8 is a photograph of a chemical communication system that can use a machine learning process to classify chemical messages in accordance with an embodiment of the invention.

A chemical communication system in accordance with an embodiment of the invention is illustrated in FIG. 8. The communication system 800 can transmit messages in chemicals from transmitter 802 to receiver 804. In several embodiments of the invention, the transmitter 802 can use electronically controlled pumps 806 to inject acids 808 and bases 810 into small tubes that have water flowing toward the receiver 802. The receiver can use a pH meter 812 to read pH values (e.g., pH=x) and detect a message (e.g., message=y). As can readily be appreciated, the pH at the receiver 804 is likely to be a function of a sequence of modifications to the pH level of the fluid. Furthermore, as readily can be appreciated, addition of any of a variety of concentrations of acid 808 and base 810 can be utilized to define a single bit or multiple bits of data appropriate to the requirements of a given application. Accordingly, machine learning can enable the training of a classifier that is capable of learning the manner in which the pH level at the receiver changes based upon different transmitted sequences of chemical messages.

It should be readily apparent to one having ordinary skill in the art that this example is merely illustrative and other chemical combinations of messages can be utilized including (but not limited) messages other than base-two (such as but not limited to acid, base, nothing for base-three), messages with additional chemicals, different types of acids, different concentrations of the same acid, proteins, and/or enzymes.

Figure 9:
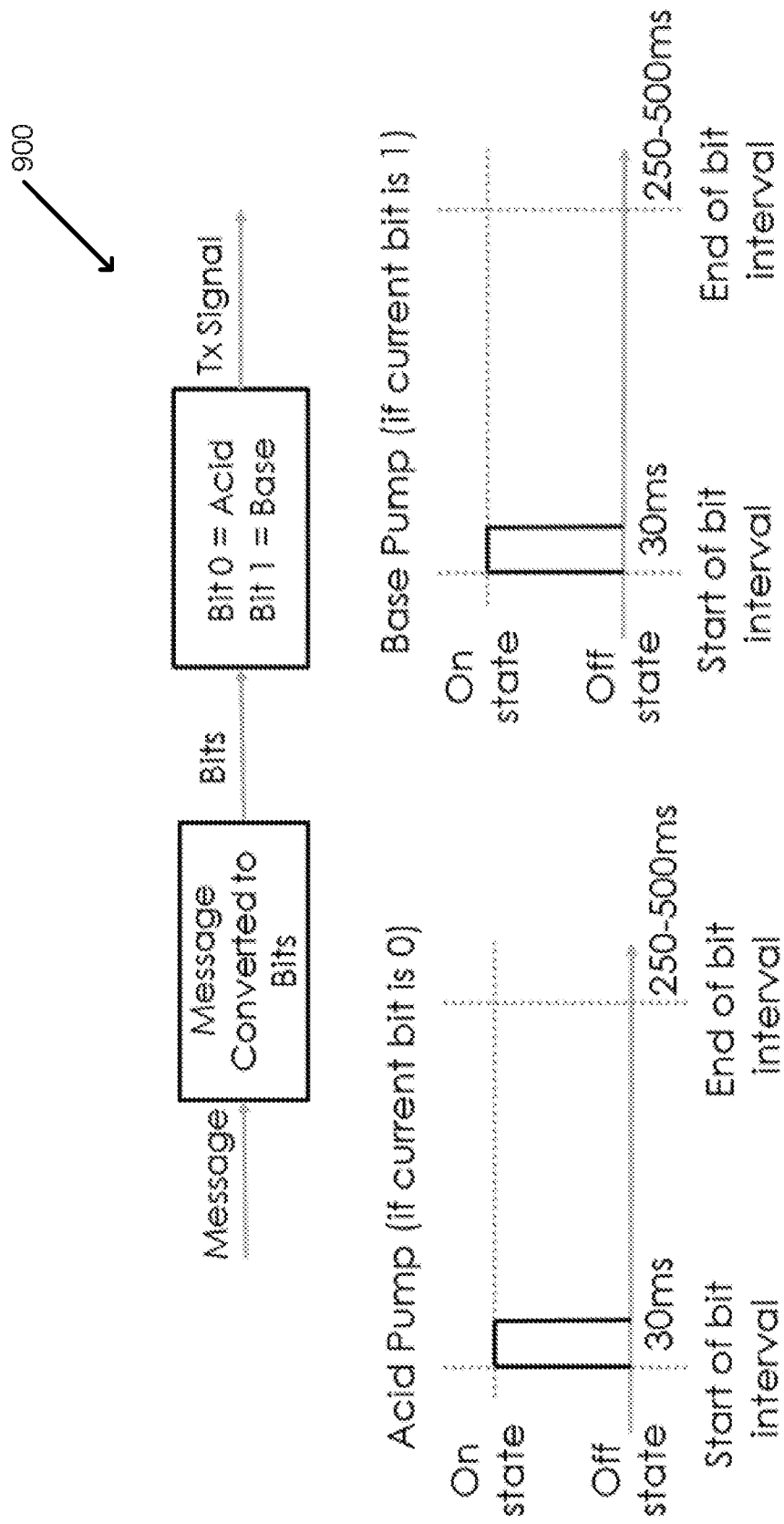
FIG. 9 is a diagram illustrating an example of transmitting chemical messages using an acid and a base in accordance with an embodiment of the invention.

Transmitting chemical messages using an acid and a base to represent messages in accordance with an embodiment of the invention is illustrated in FIG. 9. In an illustrative example, bits in a transmission sequence can be transmitted sequentially by dividing the time into equal fixed intervals between 250 and 500 ms. Although, as readily can be appreciated, any timing interval can be utilized. Many modulations of the chemicals added to the channel are possible. For example, if the current bit being transmitted is zero, the acid pump can turn on at the beginning of the current bit interval for 30 ms, and remain off for the rest of the bit interval. If the transmitted bit is a one, the base pump can turn on for 30 ms and remain off for the rest of the bit interval. It should be readily apparent to one having ordinary skill in the art that this example is merely illustrative, and many other ways of converting a message into a chemical signal can be used as appropriate to embodiments of the invention including (but not limited to) using acids to represent one and bases to represent zero, using different time intervals, using messages other than base-two, using a combination of types of acids (or combinations of types of bases), using different concentrations of the same acid (or base) and/or using other compounds other than or in addition to acids and/or bases such as (but not limited to) proteins and/or enzymes to represent ones and zeroes in chemical messages.

In some embodiments of the invention, message can be synchronized by sending a specific sequence of chemicals. In one embodiment of the invention, the message can begin with a 100 ms pulse of acid, followed by 900 ms wait before message transmission is initiated. It should readily be apparent to one having ordinary skill in the art that that a pulse of base and/or a different timed pulse and/or followed by a different timed wait can also be utilized as appropriate in various other embodiments of the invention. In some embodiments of the invention, other ways to indicate the start of a message can be used. Additionally, a message can end with a termination sequence (i.e. a special transmitted sequence that indicates the end of a message).

Figure 10:
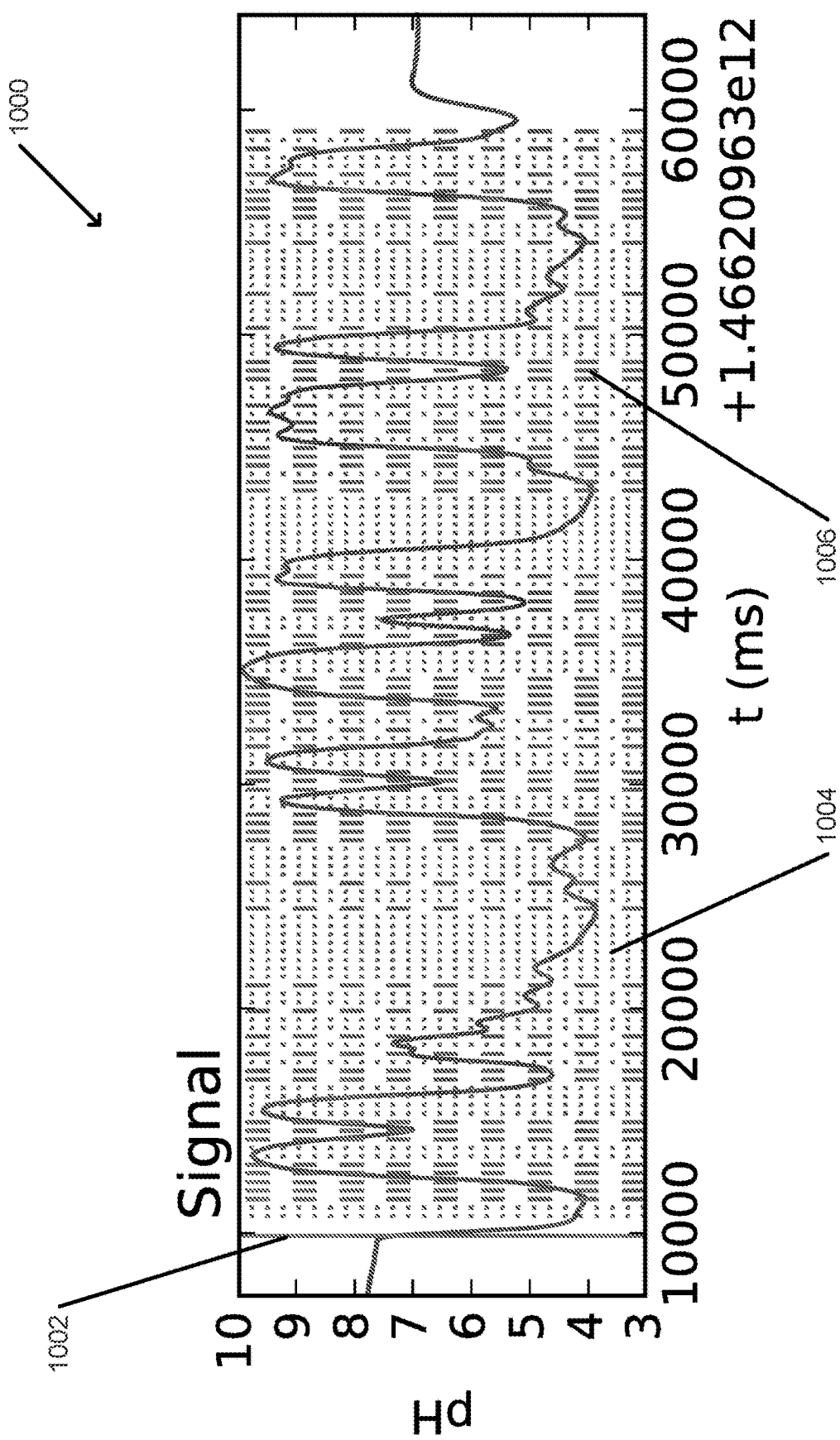
FIG. 10 is a diagram illustrating an example of receiving chemical messages transmitted using an acid and a base in accordance with an embodiment of the invention.

Receiving chemical messages using an acid and a base to represent messages in accordance with an embodiment of the invention is illustrated in FIG. 10. A receiver monitors the received pH signals. In some embodiments of the invention, this can be continuous and/or at defined time intervals. For example, an initial pulse of an acid and/or a base depending on specific embodiments of the invention to indicate the start of a message can be detected. In some embodiments of the invention the initial pulse can be detected using an edge detector process. The solid line 1002 indicates the edge detected by the receiver to indicate the start of a message. Once an initial message pulse is detected, the receiver can wait a predefined time before it begins reading the pH signal. In many embodiments of the invention, this predefined waiting time can be one second, but it should be obvious to one having ordinary skill in the art that this wait time should correspond to the initial message pulse and wait from the particular transmitter and can be a different value such that the start of a message can be detected. In several embodiments of the invention, other ways to detect the start of a message by the receiver can be used as appropriate.

The pH signal can be read by the receiver over the bit intervals corresponding with the transmitter. In the illustrative example described with respect to FIG. 9, bits are transmitted in equal fixed time intervals between 250 ms and 500 ms. A corresponding receiver would similarly read the pH signal over the 250 ms to 500 ms bit intervals. As an illustrative example, the dashed lines are the bits and the spaces between them are the bit intervals. The thinner dashed lines 1004 are an acid (bit zero) while the thicker dashed lines 1006 are a base (bit one).

Figure 11A:
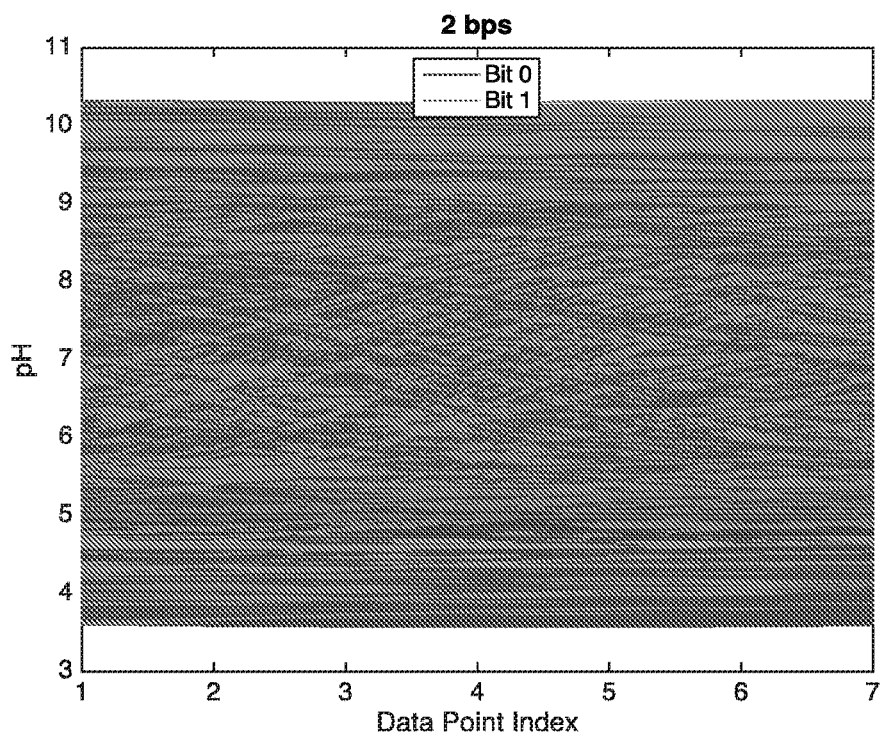
FIGS. 11A and 11B are plots illustrating filtered received pH signals with a transmission of two bits per second and four bits per second, respectively, in accordance with an embodiment of the invention.
Figure 11B:
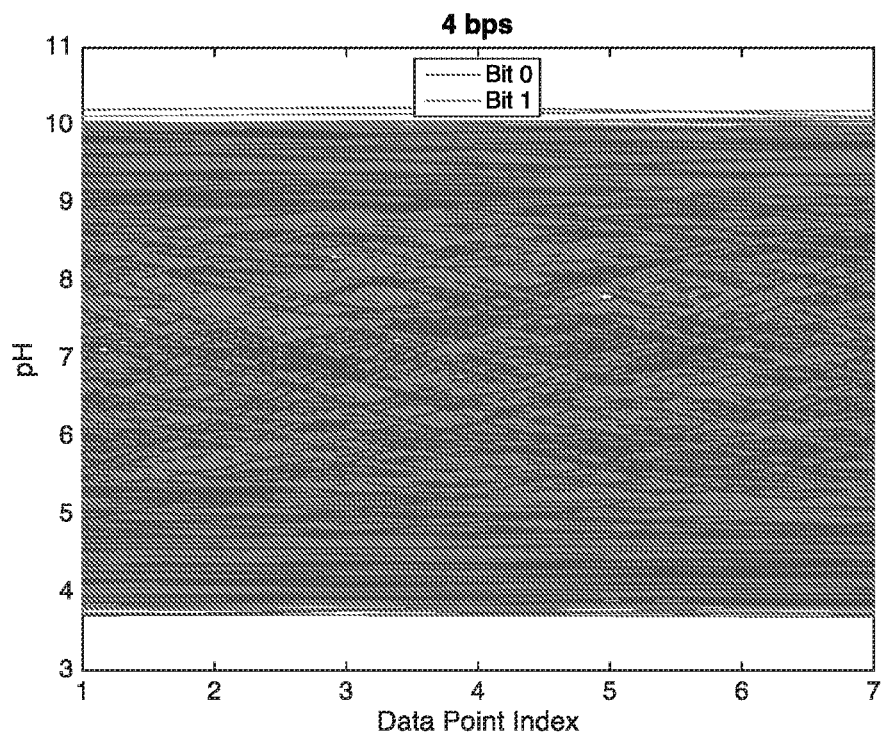

Plots illustrating a filtered received pH signal at a receiver in accordance with embodiments of the invention are illustrated in FIGS. 11A and 11B. FIG. 11A illustrates a plot with a transmission of two bits per second. FIG. 11B illustrates a pot with a transmission of four bits per second. It should be readily apparent to one having ordinary skill in the art the complexity of the signal received at the receiver due to memory within the channel that can make message detection challenging.

Although a variety of chemical communication systems including transmitters and receivers are described with reference to FIGS. 8-11B, any of a variety of computing elements to send and receive chemical messages may be utilized as appropriate to the requirements of specific applications in accordance with embodiments of the invention. Classifiers that can be trained using machine learning for classification of chemical messages in communication systems that utilize chemical channels are discussed further below.

Classifiers for Chemical Communication Systems

In several embodiments of the invention, training data sets can be created using chemical communication systems. One such training data set includes 194 messages each created by 120 random bits. In many embodiments of the invention, different bit intervals from 250 ms (4 bits per second) to 500 ms (2 bits per second) can be used when transmitting the training data, but it should be readily apparent to one having ordinary skill in the art that these bit intervals are merely illustrative and other bit intervals can be utilized. Exemplary signal speeds to transmit data from a transmitter to a receiver can include (but are not limited to): i. 30 ms pulse with 220 ms delay; ii. 30 ms pulse with a 304 ms delay; iii. 30 ms pulse with a 350 ms delay; and iv. 30 ms pulse with a 470 ms delay. (i.e. for exemplary signal speed i. the acid pump to represent a bit (or similarly the base pump to represent a bit) is turned on for 30 ms and the pump will remain off for the remainder of the 220 ms interval).

Figure 12A:
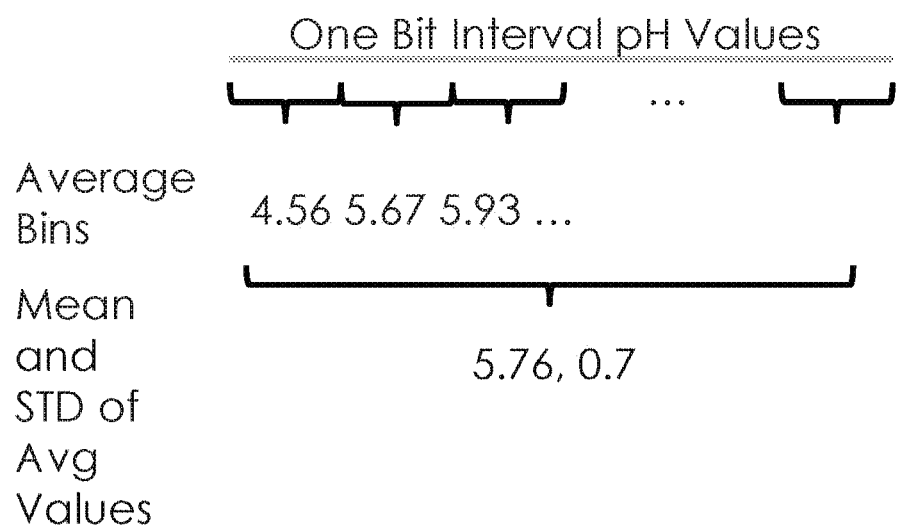
FIGS. 12A and 12B are diagrams illustrating examples of feature selection for support vector machine classifiers in accordance with an embodiment of the invention.
Figure 12B:
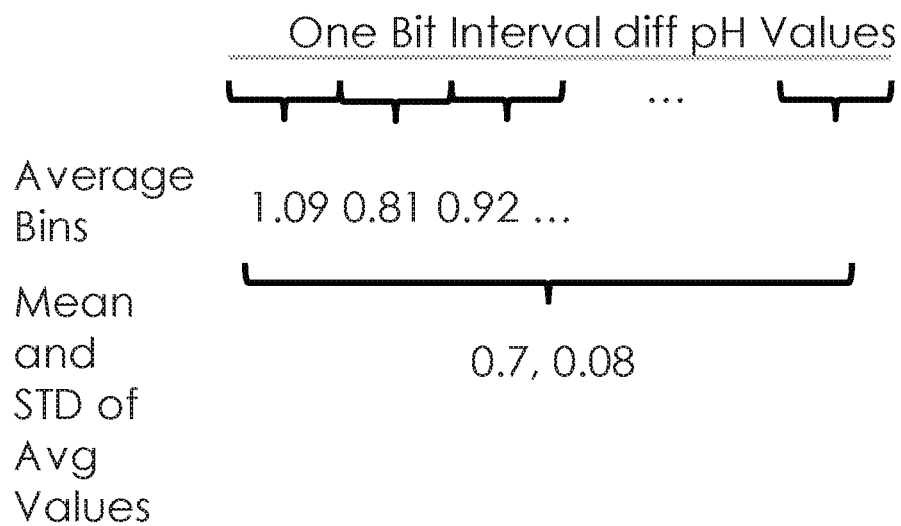

Features are often selected from chemical signals prior to machine learning classification due to the size and/or complexity of the received signal. Due to differences in specific classifiers, in some embodiments of the invention it can be appropriate to select different sets of features for different classifiers. FIGS. 12A and 12B provide examples for feature selection for support vector machine classifiers in accordance with an embodiment of the invention. A received pH signal can be divided into eight equal subintervals, forming eight bins. Features can be generated from averaging the values in each bin, and calculating the mean and standard deviation of the averaged values. Additional features can be extracted using the difference (i.e. the differential) of pH values in the bit interval. In many embodiments of the invention this approach can generate twenty features for use in classification with a support vector machine, but it should be readily apparent to one having ordinary skill in the art that this set of features can be used when training other types of classifiers and/or other sets of features can be used with support vector machine classifiers.

Figure 13A:
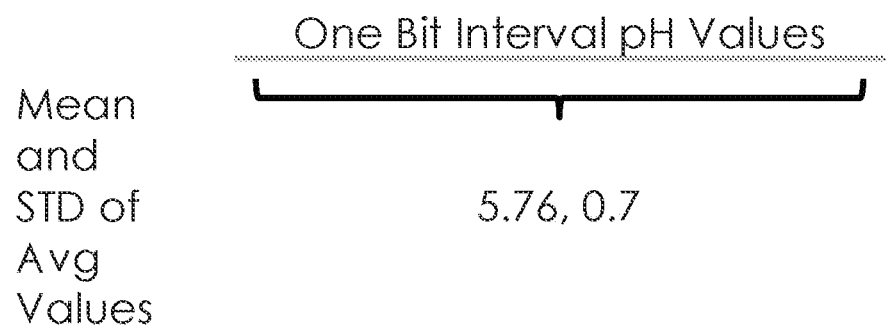
FIGS. 13A and 13B are diagrams illustrating examples of feature selection in recurrent neural network classifiers in accordance with an embodiment of the invention.
Figure 13B:
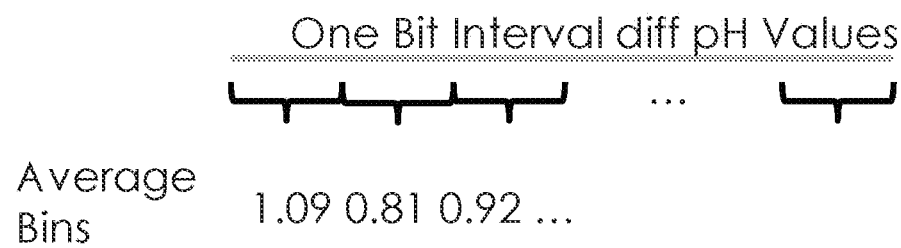

FIGS. 13A and 13B provide examples for feature selection in a recurrent neural network classifier in accordance with an embodiment of the invention. In some embodiments of the invention, a differential of the raw pH values can be separated into eight bins and averaged. The mean and standard deviation of pH values over the bit interval (or symbol interval where multiple bits are transmitted per symbol) can also be calculated as features. This gives a total of 10 features to use as input for an illustrative example of a recurrent neural network. This illustrative example of a recurrent neural network is a three layer network with an input of the ten features, ten hidden neurons, and two output neurons. It should be obvious to one having ordinary skill in the art that this is merely an illustrative example and for example (but not limited to) other types of neural networks, different numbers of layers, different sized inputs, different numbers of hidden neurons, and/or different numbers of outputs can be used as appropriate to specific embodiments of the invention.

Although the present invention has been described in certain specific aspects, many additional modifications and variations would be apparent to those skilled in the art. In particular, any of the various processes described herein can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

What is claimed is:

1. A communication system controller, comprising:
   a processor;
   a receiver; and
   a memory containing instructions that when read by the processor direct the processor to perform operations including:
   obtaining a transmission signal, using the receiver, wherein:
   the transmission signal is encoded with a message,
   the receiver receives the transmission signal via a communication channel, and
   the communication channel is the medium through which signals are transmitted to the receiver;
   extracting features in the transmission signal;
   detecting the content of the message based on the extracted features using a machine learning classifier, wherein the machine learning classifier is trained by:
   receiving a training message;
   comparing a detected value of the content of the training message and a known value of the content of the training message; and
   updating the machine learning classifier based on a difference between the detected value of the content of the training message and the known value of the content of the training message; and
   training the machine learning classifier using the classified transmission signal.

2. The communication system controller of claim 1, wherein:
   the processor fails to detect a message in a second transmission signal; and
   the processor retrains the machine learning classifier using training data.

3. The communication system controller of claim 2, wherein the processor detects a message in the second transmission signal using the machine learning classifier after retraining the machine learning classifier.

4. The communication system controller of claim 2, wherein the second transmission signal is added to the training data.

5. The communication system controller of claim 1, wherein the communication channel is selected from the group consisting of twisted-pair wires, coaxial cables, fiber optic cables, and tubes for chemicals.

6. The communication system controller of claim 1, wherein the communication channel is selected from the group consisting of microwave, satellite, radio, and infrared.

7. The communication system controller of claim 1, wherein features are extracted from the transmission signal are based on properties of the signal selected from the group consisting of the phase of the signal, the magnitude of the signal, the rate at which the signal is changing, and the average received signal power.

8. The communication system controller of claim 1, wherein the machine learning classifier comprises a recurrent neural network.

9. A method, comprising:
obtaining a transmission signal using a communication system controller comprising a processor, a memory, and a receiver, wherein:
the transmission signal is encoded with a message,
the receiver receives the transmission signal via a communication channel, and
the communication channel is the medium through which signals are transmitted to the receiver;
extracting features in the transmission signal using the communication system controller;
detecting the content of the message based on the extracted features using the communication system controller using a machine learning classifier, wherein the machine learning classifier is trained by:
receiving a training message;
comparing a detected value of the content of the training message and a known value of the content of the training message; and
updating the machine learning classifier based on a difference between the detected value of the content of the training message and the known value of the content of the training message; and
training the machine learning classifier using the classified transmission signal.

10. The method of claim 9, further comprising:
failing to detect a message in a second transmission signal using the communication system controller; and
retraining the machine learning classifier based on training data using the communication system controller.

11. The method of claim 10, further comprising detecting a message in the second transmission signal using the machine learning classifier after retraining the machine learning classifier using the communication system controller.

12. The method of claim 10, wherein the second transmission signal is added to the training data.

13. The method of claim 9, wherein the communication channel is selected from the group consisting of twisted-pair wires, coaxial cables, fiber optic cables, and tubes for chemicals.

14. The method of claim 9, wherein the communication channel is selected from the group consisting of microwave, satellite, radio, and infrared.

15. The method of claim 9, wherein features are extracted from the transmission signal are based on properties of the signal selected from the group consisting of the phase of the signal, the magnitude of the signal, the rate at which the signal is changing, and the average received signal power.

16. The method of claim 9, wherein the machine learning classifier comprises a recurrent neural network.

\* \* \* \* \*